United States Patent
Horbrügger et al.

(10) Patent No.: US 9,914,617 B2
(45) Date of Patent: Mar. 13, 2018

(54) ELEVATOR POWER MANAGEMENT TO AUGMENT MAXIMUM POWER LINE POWER

(75) Inventors: Herbert Horbrügger, Berlin (DE); Michael Mann, Berlin (DE); Dirk H. Tegtmeier, Berlin (DE)

(73) Assignee: OTIS ELEVATOR COMPANY, Farmington, CT (US)

(*) Notice: Subject to any disclaimer, the term of this patent is extended or adjusted under 35 U.S.C. 154(b) by 525 days.

(21) Appl. No.: 14/415,236

(22) PCT Filed: Jul. 18, 2012

(86) PCT No.: PCT/US2012/047159
§ 371 (c)(1),
(2), (4) Date: Jan. 16, 2015

(87) PCT Pub. No.: WO2014/014454
PCT Pub. Date: Jan. 23, 2014

(65) Prior Publication Data
US 2015/0203328 A1    Jul. 23, 2015

(51) Int. Cl.
*B66B 1/06* (2006.01)
*B66B 1/30* (2006.01)
(Continued)

(52) U.S. Cl.
CPC .......... *B66B 1/302* (2013.01); *H02J 7/0068* (2013.01); *H02P 4/00* (2013.01); *Y10T 307/32* (2015.04);
(Continued)

(58) Field of Classification Search
CPC .......... B66B 1/302; H02J 7/0068; H02P 4/00; Y10T 307/32; Y10T 307/505; Y10T 307/527
(Continued)

(56) References Cited

U.S. PATENT DOCUMENTS 5,285,029 A    2/1994 Araki
6,415,892 B2 *  7/2002 Araki ................ B66B 1/302
                                            187/290
(Continued)

FOREIGN PATENT DOCUMENTS

CN    101544331 A    9/2009
CN    202284108 U    6/2012
(Continued)

OTHER PUBLICATIONS

Chinese Office Action and Search for application CN 201280074782.2, dated Nov. 16, 2015, 13 pages.
(Continued)

*Primary Examiner* — Anthony Salata
(74) *Attorney, Agent, or Firm* — Cantor Colburn LLP

(57) ABSTRACT

A system for managing elevator power includes a power line connected to a power grid, a motor connected to the power line and configured to receive power from the power line to drive an elevator, an alternative power source connected to the motor, and a power control system configured to control the power line to supply power to the motor to drive the elevator, to detect a predetermined threshold value of power supplied from the power line, and to supply both power from the power line and power from the alternative power source to the motor based on a determination that the predetermined threshold value of power is supplied from the power line.

17 Claims, 5 Drawing Sheets

(51) Int. Cl.
   *H02J 7/00* (2006.01)
   *H02P 4/00* (2006.01)
(52) U.S. Cl.
   CPC ........ *Y10T 307/505* (2015.04); *Y10T 307/527* (2015.04)
(58) Field of Classification Search
   USPC ....... 187/247, 277, 289, 290, 293, 296, 297, 187/391, 393; 307/64, 66; 318/362, 376, 318/377
   See application file for complete search history.

(56) References Cited

U.S. PATENT DOCUMENTS

| | | | |
|---|---|---|---|
| 6,422,351 B2 | 7/2002 | Tajima et al. | |
| 6,435,311 B2* | 8/2002 | Araki | B66B 1/30 187/290 |
| 7,554,278 B2* | 6/2009 | Wegner-Donnelly | B66C 13/18 187/277 |
| 8,172,042 B2* | 5/2012 | Wesson | B66B 1/302 187/290 |
| 8,220,590 B2* | 7/2012 | Chen | B66B 1/302 187/290 |
| 8,230,978 B2* | 7/2012 | Agirman | B66B 1/302 187/290 |
| 8,616,338 B2* | 12/2013 | Veronesi | B66B 1/302 187/290 |
| 8,622,177 B2* | 1/2014 | Acquaviva | B66B 1/302 187/285 |
| 8,887,872 B2* | 11/2014 | Chen | G01R 31/3651 187/290 |
| 9,440,819 B2* | 9/2016 | Rossignol | B66B 1/302 |
| 2015/0122589 A1* | 5/2015 | Mezzadri | B66B 1/306 187/290 |
| 2016/0083220 A1* | 3/2016 | Agirman | H02J 7/02 187/290 |
| 2016/0145075 A1* | 5/2016 | Hanninen | B66B 1/34 187/289 |

FOREIGN PATENT DOCUMENTS

| | | |
|---|---|---|
| JP | 2002154762 A | 5/2002 |
| KR | 1020000057507 A | 9/2000 |
| KR | 100980803 B1 | 9/2010 |
| WO | 2010042118 A1 | 4/2010 |

OTHER PUBLICATIONS

European Search Report for application EP 12881421.7, dated Dec. 1, 2016, 6 pages.
International Search Report for application PCT/US2012/047159, dated Mar. 15, 2013, 5 pages.
Written Opinion for application PCT/US2012/047159, dated Mar. 15, 2013, 5 pages.

* cited by examiner

ELEVATOR POWER MANAGEMENT TO AUGMENT MAXIMUM POWER LINE POWER

BACKGROUND OF THE INVENTION

The present disclosure relates to management of elevator power, and in particular to using an alternate power source such as a battery to supplement power provided to an elevator motor from a power line.

Demand exists for running an elevator with a two-phase power supply, but line peak power on a two-phase power supply may be insufficient to drive an elevator weighing approximately 630 kg at 1 m/s, for example. In addition, power line fluctuations, brownouts and intermediate breakdowns may cause the elevator to stop.

BRIEF DESCRIPTION OF THE INVENTION

Embodiments include a system comprising a power line connected to a power grid, a motor connected to the power line and configured to receive power from the power line to drive an elevator, an alternative power source connected to the motor, and a power control system configured to control the power line to supply power to the motor to drive the elevator, to detect a predetermined threshold value of power supplied from the power line, and to supply both power from the power line and power from the alternative power source to the motor based on a determination that the predetermined threshold value of power is supplied from the power line.

Embodiments further include an elevator motor power management circuit, comprising a speed profile generator configured to detect a rotation speed of the motor driving an elevator and to detect whether the rotation speed corresponds to a target rotation speed, and a power controller to detect a power level of a power line connected to a power grid and an alternative power source and to control the alternative power source to output power to the motor in addition to power supplied from the power line upon determining that a power level of the power line is at a predetermined maximum level and the rotation speed of the motor is less than the target rotation speed.

Embodiments further include a method, comprising detecting a rotation speed of a motor configured to drive an elevator, detecting a power level of a power line supplying power to the motor, and combining power from an alternative power source with power from the power line to drive the motor upon determining that the power level of the power line is at a predetermined maximum level and a rotation speed of the motor is less than a target rotation speed.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 2 illustrates an elevator power management system according to an embodiment of;

DETAILED DESCRIPTION OF THE INVENTION

Figure 1:
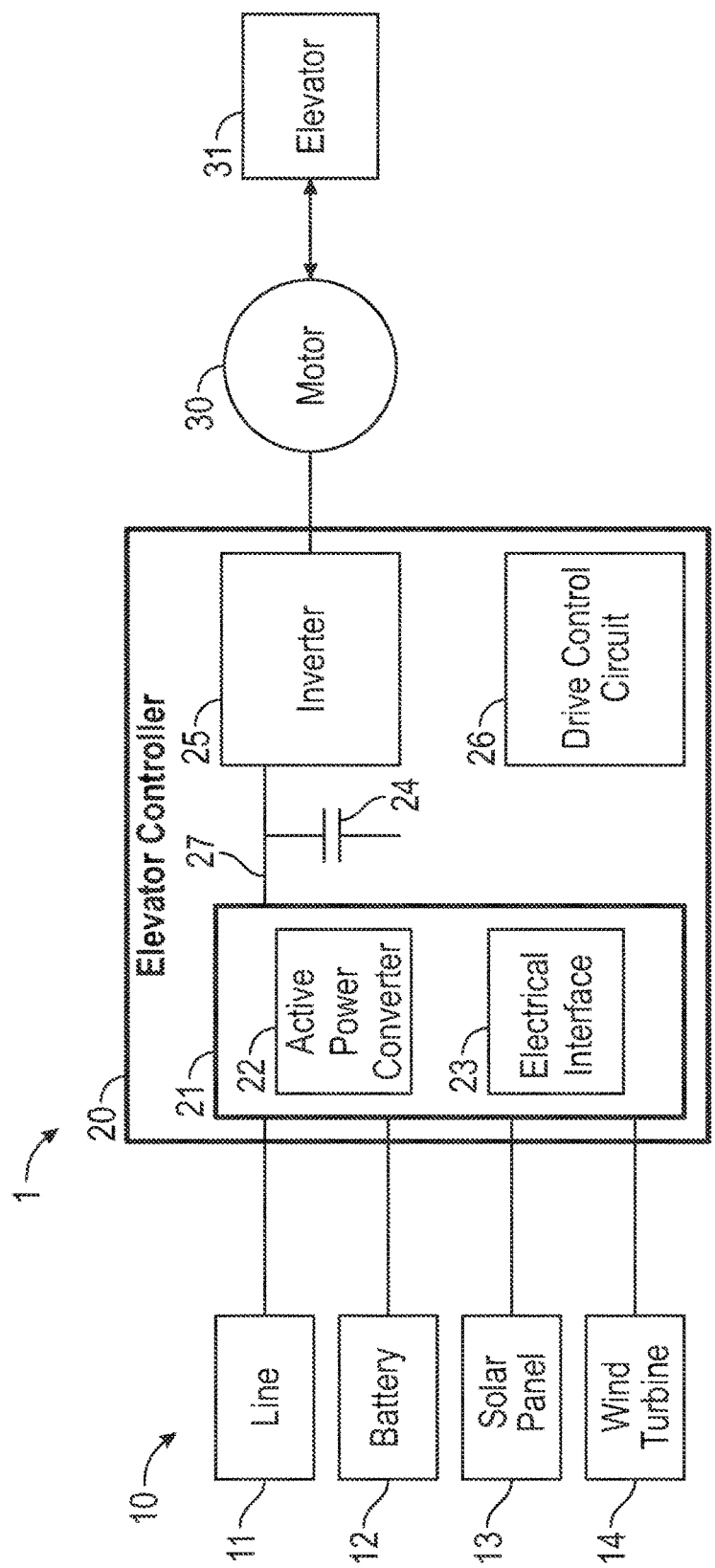
FIG. 1 illustrates an elevator power management system according to one embodiment.

FIG. 1 illustrates an elevator power management system 1 according to one embodiment. The elevator power management system 1 includes power sources 10, including a power line 11 connected to a power grid and a battery 12. The power sources 10 may include additional power sources, such as a solar panel 13, wind turbine 14, or other power generating devices. The system 1 includes an elevator controller 20 and a motor 30 configured to drive an elevator 31. The elevator controller 20 includes a power interface circuit 21 including an active power converter 22 to convert power from the line 11 and the battery 12 to a power on the internal power line 27. For example, if power is supplied from the line 11 in the form of alternating current (AC), the active power converter 22 may convert the AC power to direct current (DC) power on the internal line 27.

The elevator controller 20 may further include a capacitance circuit 24 of one or more capacitors or capacitive elements and an electrical interface 23 to provide a power interface between a solar panel 13, wind turbine 14, or other power generating circuit and the internal power line 27. The elevator controller 20 may further include an inverter 25 to convert the power of the internal power line 27 to power to be output to the motor 30 and a drive control circuit 26 configured to control the power output to the motor 30. In one embodiment, the inverter includes a plurality of switches, such as transistors, that are controlled to generate an AC current to drive the motor 30. For example, increasing a duty cycle of a signal by increasing an on time of the switches may increase a power level applied to the motor 30 to increase the speed of the motor 30.

In embodiments, the drive control circuit 26 may detect power levels of one or more of the power sources 10 and may adjust power levels provided from the power interface circuit to the internal power line 27 accordingly. For example, in one embodiment, the drive control circuit 26 may detect that a power output from the power line 11 is less than a target power level, and the drive control circuit 26 may control an output of power corresponding to the battery 12 from the power interface circuit 21 to provide additional power at the internal power line 27.

In other embodiments, the drive control circuit 26 may detect a power level output from the motor 30, such as power generated by energy resulting from a descending elevator 31, and may output power from the motor 30, or another regenerative source, to one or more of the power sources 10, such as the power line 11 and the battery 12 via the power interface circuit 21.

Figure 2:
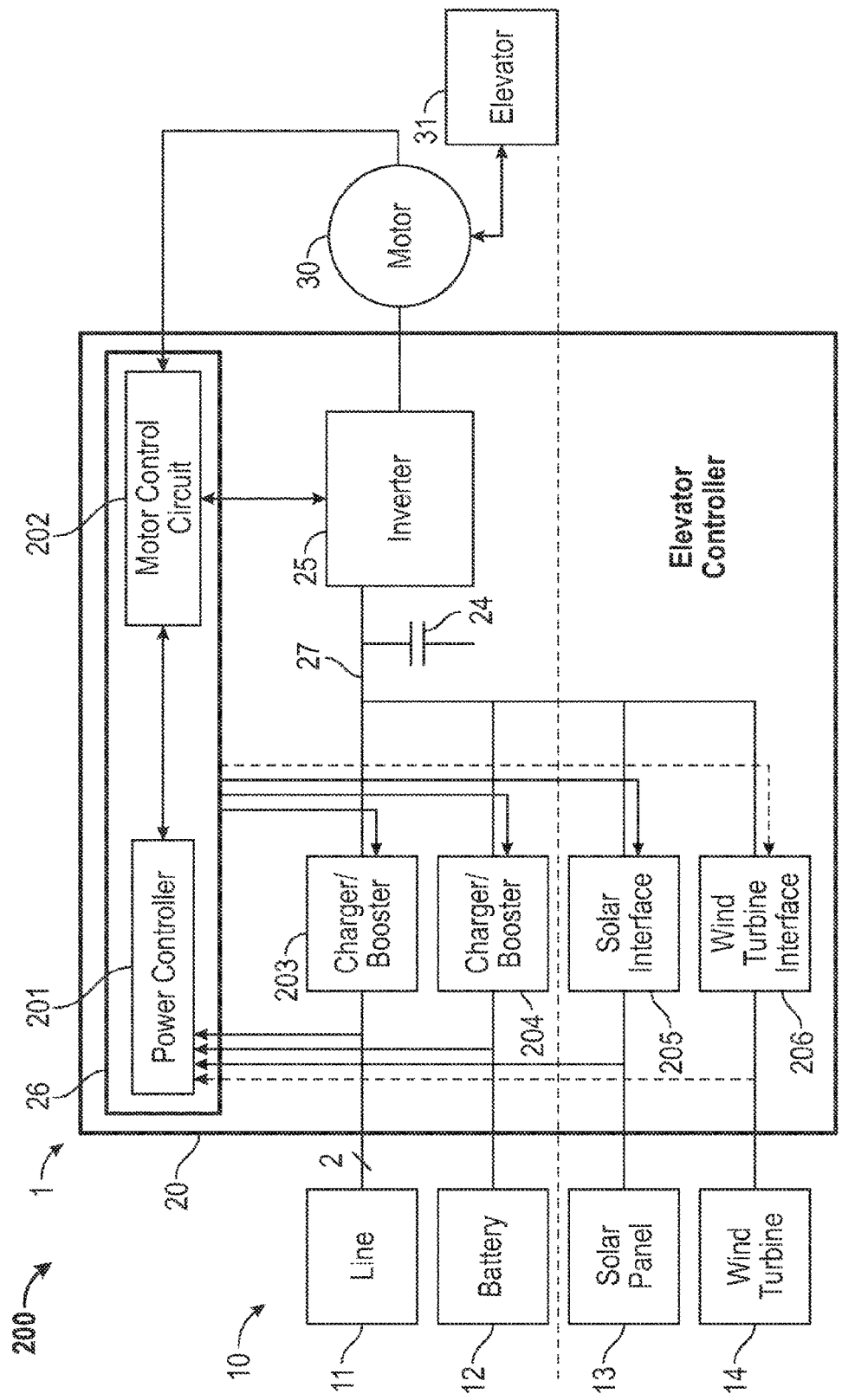

FIG. 2 illustrates an elevator power management system 200 according to an embodiment. Similar to the power management system 1 of FIG. 1, the elevator power management system 200 includes the power sources 10, including the power line 11 connected to a power grid and the battery 12, and may include additional power sources such as a solar panel 13 and a wind turbine 14. The system 200 includes the elevator controller 20 and the motor 30. The elevator controller 20 includes the capacitive circuit 24, the inverter 25, and the drive control circuit 26. Although a battery 12 is illustrated in FIG. 2, any power storage device capable of storing electrical power and supplying the electrical power to the power management system may be utilized.

The active power converter 22 of FIG. 1 corresponds to one or more charger/booster circuits 203 and 204, and the electrical interface 23 of FIG. 1 corresponds to a solar interface 205 and a wind turbine interface 206 of FIG. 2. The charger/booster 203 is connected between the power line 11 connected to the grid and the internal power line 27 connected to the motor 30 via the inverter 25. The charger/booster 203 may include one or more rectifier circuits, filters, and other circuitry to generate a power level on the internal power line 27, such as a DC power level. The charger/booster 204 may include one or more DC/DC converters to convert one DC power level to another DC power level.

The drive control circuit 26 includes a power controller 201 and a motor control circuit 202. In one embodiment, the motor control circuit 202 receives signals from the motor 30 corresponding to an operation of the motor 30, such as a rotation speed of the motor 30. The motor control circuit 202 outputs a speed control signal to the inverter 25 to control a power signal output from the inverter 25 to the motor 30. The speed control signal adjusts a power level output from the inverter 25 to the motor 30 to drive the motor.

The power controller 201 receives from the power sources 10 signals indicating an input power level of each of the respective power sources 10, and outputs to the power interface circuit, including the charger/boosters 203 and 204, the solar interface 205 and the wind turbine interface 206, control signals to control the flow of power from the power sources 10 to the internal power line 27, and from the internal power line 27 to the power sources 10.

The power controller 201 receives from the motor control circuit 202 a power limit signal when it determines that a power level output by the inverter 25 is at a maximum threshold level and a motor speed 30 is less than a target speed. In embodiments, the power controller 201 controls one or more of the charger/booster 204, the solar interface 205, and the wind turbine interface 206 to increase a power output from the respective power source 10.

Figure 3:
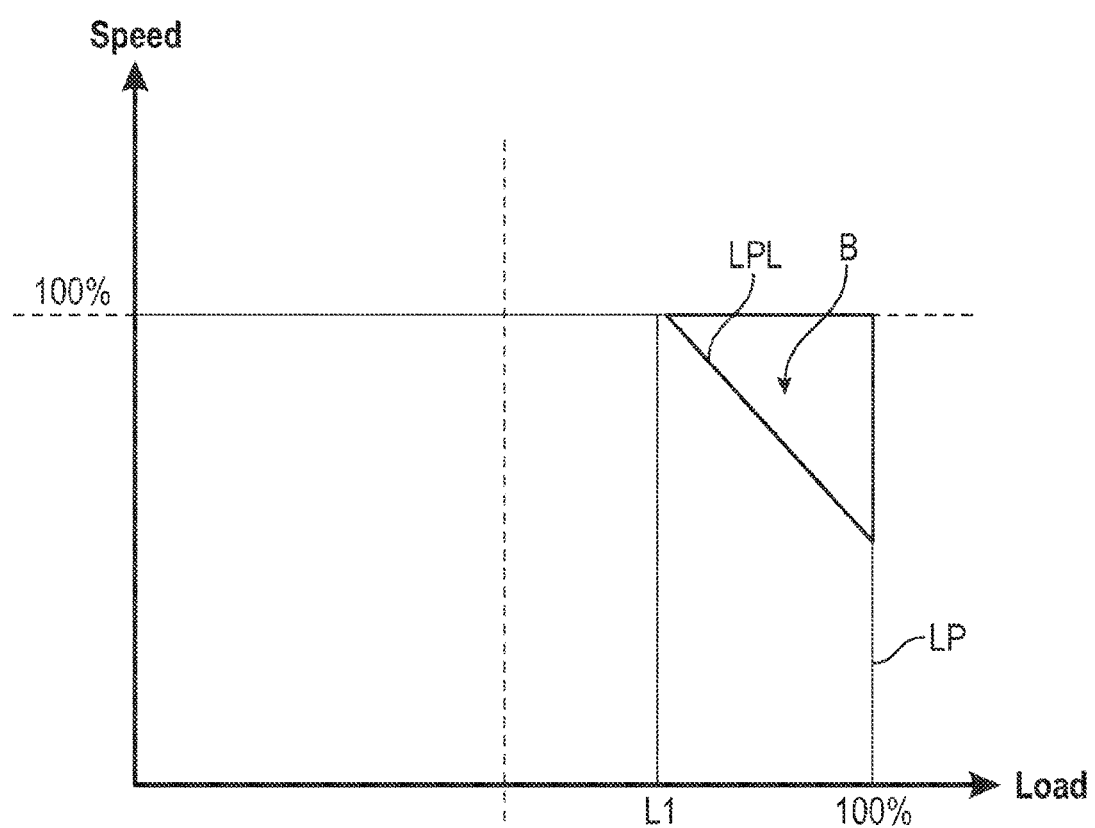
FIG. 3 is a chart illustrating power supplied to an elevator according to an embodiment.

FIG. 3 is a chart illustrating power supplied to the motor 30 according to an embodiment. When a load on the motor 30, which in one embodiment corresponds to a load on an elevator 31, is L1 or less, the motor 30 is capable of operating at full speed based solely on power LP from the power line 11. The load L1 may correspond to an electrical load, which may, in turn, correspond to a physical load on the motor 30. For example, when a heavier load is provided in an elevator 31, the amount of power required to drive the motor 30 at full speed may increase.

At point L1, the line power LP reaches its limit LPL, so that the power line 11 alone generates insufficient power to operate the motor 30 at full speed. Upon detecting that the line power limit LPL has been reached, and that the motor 30 operates at less than full speed, the motor control circuit 202 may output to the power controller 201 the power limit signal. Upon receiving the power limit signal, the power controller 201 may generate control signals to one or more of the charger/booster 204, solar interface 205, and the wind turbine interface 206 to permit power to be output from the charger/booster 204, solar interface 205, and/or the wind turbine interface 206. The increased power output from the battery 12, solar panel 13, and/or the wind turbine 14 provides an active power boost B to increase a power level on the internal power line 27 and to the motor 30.

In one embodiment, power from the power line 11 provides the primary power to the motor 30, and power from one or more additional power sources 10, such as a battery 12, solar panel 13, and a wind turbine 14 provide power to supplement the power line 11. For example, until the drive control circuit 26 detects that the power line 11 is insufficient to drive the motor 30 at full speed, the drive control circuit 26 may control the power interface circuit 21 to output power only from the power line 11.

In another embodiment, the drive control circuit 26 may control the power interface circuit 21 to output power from more than one power source 10 during regular operation. For example, the drive control circuit 26 may utilize power from each of the power line 11, the solar panel 13, and the wind turbine 14 during normal operation, and may draw power from the battery 12 only when the power generated by the other power sources 10 is insufficient.

In one embodiment, the power line 11 is a two-phase power line, and the power generated by the battery 12 is connected to a third phase. In one embodiment, one or both of the solar panel 13 and the wind turbine 14 are also connected to the third phase.

In another embodiment, the battery 12 is charged using power from the internal power line 27. For example, in one embodiment in which the motor 30 is an elevator motor, and the elevator 31 includes a regenerative power capability, the motor 30 may output a power during descent of the elevator 31. In such a case, the inverter 25 may supply power to the internal power line 27, and the power controller 201 may control the charger/booster 203 and the charger/booster 204 to supply the power from the internal power line 27 to the power line 11 and the battery 12, respectively.

In yet another embodiment, a portion of the power generated by the power line 11 and supplied by the charger/booster 203 to the internal power line 27 may be supplied to the battery 12 via the charger/booster 204. For example, if a load of the motor 30 is less than L1, excess power that may be provided from the power line 11 may be supplied to the battery 12 to charge the battery 12.

Figure 4:
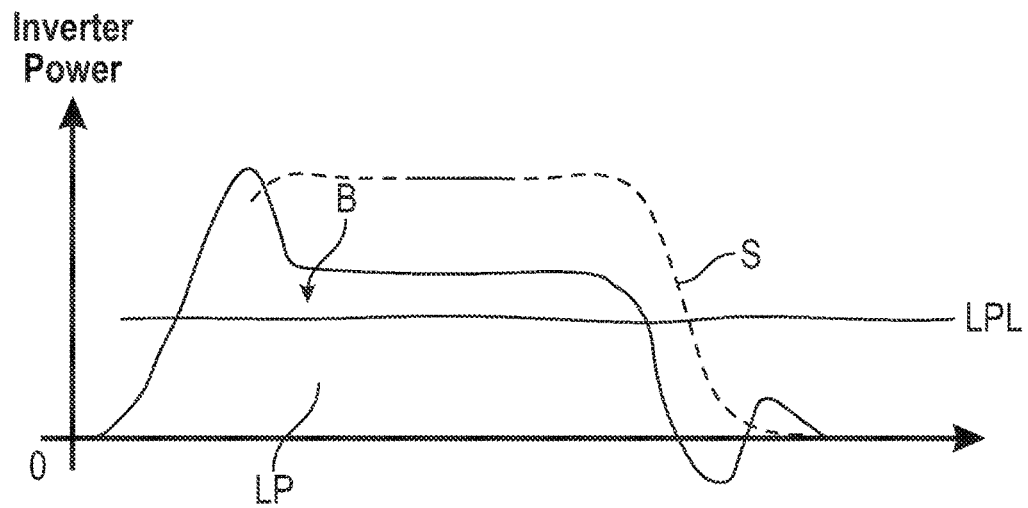
FIG. 4 is a chart illustrating power supplied to an elevator according to an embodiment.

FIG. 4 is a chart illustrating power supplied to a motor according to one embodiment. In FIG. 4, the power line 11 drives the motor 30 until a line power limit LPL is reached, at which point a boost power, B, is provided to maintain a full speed of the motor 30. In FIG. 4, a dashed line is provided to indicate a speed S of the motor 30. Providing the boost power B to the line power LP allows the speed of the motor 30 to be maintained at a target level.

Figure 5:
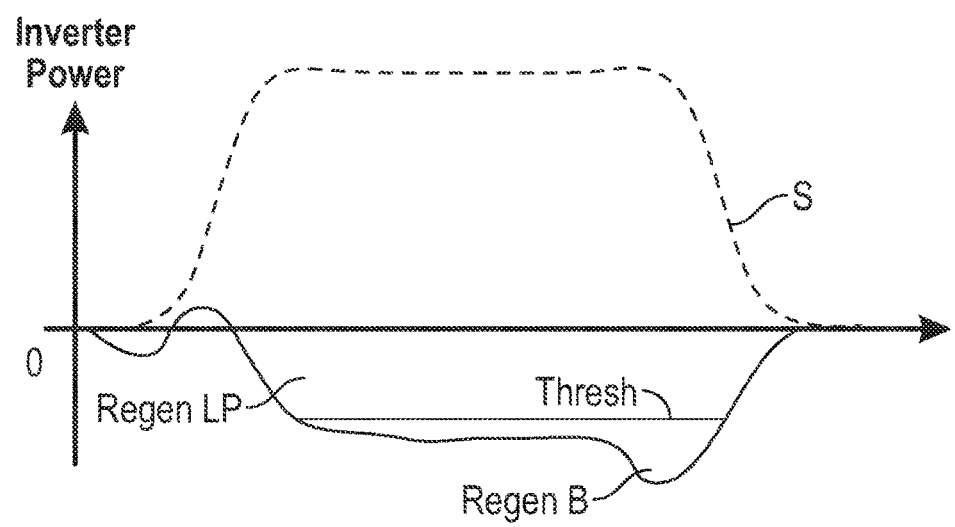
FIG. 5 is a chart illustrating regenerative power supplied from a motor according to one embodiment.

FIG. 5 is a chart illustrating regenerative power supplied from a motor 30 according to one embodiment. When the motor 30, or other regenerative source, generates power, such as when an elevator 31 descends having a load therein, the elevator 31 includes a regenerative power system and the regenerative power system generates power, the drive control circuit 26 provides power LP first to the power line 11. If the generated power exceeds a threshold value Thresh, then any power B generated that exceeds the threshold value Thresh is provided to the battery 12 to recharge the battery 12.

Figure 6:
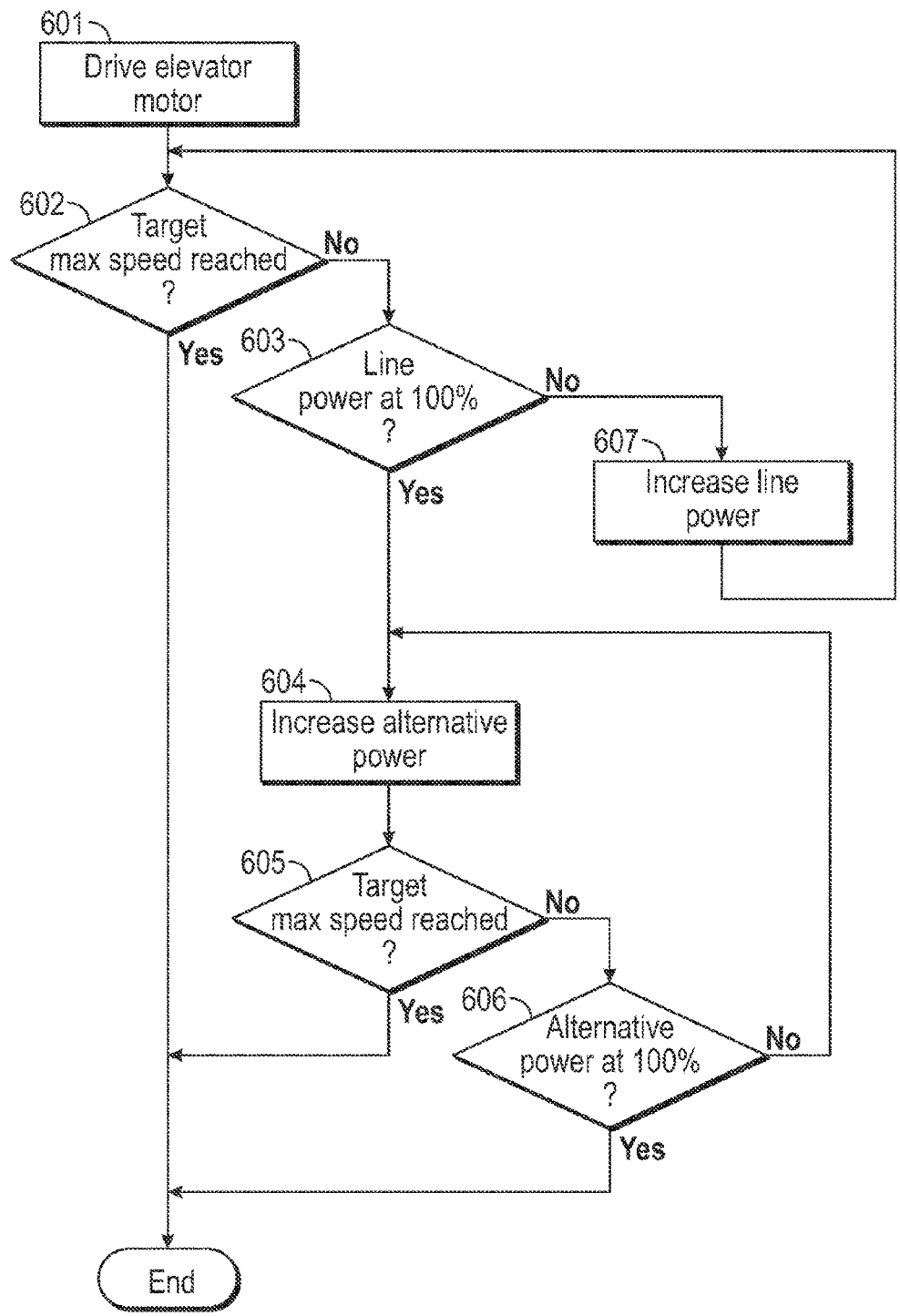
FIG. 6 is a flowchart illustrating supplementing power supplied to a motor from a power line according to one embodiment.

FIG. 6 is a flowchart illustrating supplementing power supplied to a motor 30 from a power line 11 according to one embodiment. In block 601, a motor 30 configured to drive an elevator 31 is driven by applying power to the motor 30. In block 602, it is determined whether a desired maximum speed is reached. If so, the process ends. If it is determined in block 602 that the desired maximum speed has not been reached, then it may be determined in operation 603 whether the line power is at 100%. If not, than the line power may be increased in operation 607, and the speed may be again compared with a target speed in operation 602.

In one embodiment, detecting the line power in operation 603 may include detecting power levels of the power sources 10. Detecting the line power may also include detecting power input to or output from the inverter 25. In one embodiment, increasing the line power 607 includes increasing a level of power output from an inverter 25 to the motor 30. For example, a level of power supplied from the power line 11 to the internal power line 27 may be increased by controlling the charger/booster 203, and the power output from the internal power line 27 to the motor 30 may be increased in operation 607 by increasing a duty ratio of switches of the inverter 25.

If it is determined in operation 603 that the line power is at 100%, or that the power output from the inverter 25 cannot be increased based on the present power input to the charger/booster 203 and/or the inverter 25, an alternative power level may be increased in operation 604. In one embodiment, increasing the alternative power level includes increasing the power from the battery 11 to the internal power line 27. In addition, the power from one or more additional power sources, such as the solar panel 13, the wind turbine 14, or any other power source may be increased to the internal power line 27. In one embodiment, the motor control circuit 202 may output a power limit signal to the power controller 201 to indicate that the inverter 25 is outputting a maximum power level to the motor 30 based on the power level of the internal power line 27, and the motor 30 is operating at less than target speed. The power controller 201 may then output control signals to the charger/booster 204 and one or more of the solar interface 205 and the wind turbine interface 206 to increase a power provided to the internal power line 27 to thereby increase a power level provided to the motor 30.

In block 605, it may be determined whether a target speed has been reached by the motor 30. For example, the motor 30 may output a sensor signal or a control signal to the motor control circuit 202 indicating a present motor speed, and the motor control circuit 202 may compare the present motor speed to a target speed. If it is determined in block 605 that a target speed has been reached, then the process of boosting the power supplied to the motor 30 ends. However, if it is determined in operation 605 that the target speed has not been reached, it may be determined in block 606 whether the power level supplied from the alternative power sources 10, including the battery 12 and one or more of the solar panel 13 and the wind turbine 14, is at 100%. If so, the power boost process ends, and the motor 30 is operated at a speed less than 100%. Otherwise, the power output from alternative power sources 604 is increased.

According to embodiments, a motor 30 configured to drive an elevator 31 may be operated even when one or more power sources 10 fails or outputs an insufficient level of power to drive the motor 30 at full speed. For example, even if the battery 12 fails, the power line 11 may still drive the motor 30 at less than full speed. Conversely, if the power line 11 fails, the battery 12, solar panel 13, and wind turbine 14, or any other alternative power source 10, may generate power to drive the motor 30.

In addition, the motor 30 may be operated at full speed even when one or more of the power sources 10 generates insufficient power to drive the motor 30. For example, if the power line 11 generates insufficient power to drive a particular load with the motor 30, one or more alternative power sources, such as the battery 12, the solar panel 13, and the wind turbine 14 may provide a power boost to provide the additional power to drive the motor 30. Thus, while in some embodiments the power sources 10 are capable of functioning in the alternative, such as operating the motor 30 using power from the power line 11 instead of the battery 12, or operating the motor 30 using power from the battery 12 instead of the power line 11, in other embodiments, the power sources 10 may be used together to boost power to levels greater than the power sources 10 operating singly.

In addition, when more power is generated by one or more of the power line 11, the solar panel 13, and the wind turbine 14 than is needed to drive the motor 20 at a target speed, any excess generated power may be directed to the battery 12 to charge the battery 12. For example, when the motor 30 is in an idle state and no power is needed to drive the motor 30, power from the solar panel 13, wind turbine 14, or other power source may be provided to the internal power line 27, and supplied to the battery 12 via the charger/booster 204. In addition, when more power is generated by one or more of the power line 11, the solar panel 13, and the wind turbine 14 than is needed to drive the motor 20 at a target speed, any excess generated power may be directed to the grid, or to the power line 11 connected to the grid. In one embodiment, part of the excess power is supplied to the grid via the power line 11 and the rest is supplied to the battery 12.

While a solar panel 13 and wind turbine 14 are provided as two examples of alternative power sources, it is understood that any power source may be provided to the system 1 or 200 to provide power to the system 1 or 200. In addition, while in one embodiment the system is described as a three-phase power system, it is understood that embodiments are not limited to a three-phase power system, but may include power systems having any number of desired phases. In addition, while embodiments are directed to a motor 30 configured to drive an elevator 31, it is understood that embodiments may be directed to any system in which a motor 30 drives a vehicle, carriage, platform, or other structure capable of having a varying load, and configured for providing regenerative power from the motor 30.

It is understood that circuits described in embodiments may include hardware, including processors, memory, logic circuits, and other supporting circuitry to calculate values, compare signals, process signals, and generate signals. In addition, embodiments encompass software programs stored in memory and executed by a processor to control the supply of power from power sources 10 to a motor 30 configured to drive an elevator 31, as well as from the motor 30 to the power sources 10 in the manner set forth herein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A system, comprising:
a power line connected to a power grid;
a motor connected to the power line and configured to receive power from the power line to drive an elevator;

an alternative power source connected to the motor; and
a power control system configured to control the power line to supply power to the motor to drive the elevator, to detect a predetermined threshold value of power supplied from the power line, and to supply both power from the power line and power from the alternative power source to the motor based on a determination that the predetermined threshold value of power is supplied from the power line;
wherein the predetermined threshold value of power is a maximum power level able to be supplied from the power line.

2. The system of claim 1, wherein the power control system is configured to determine whether a desired motor output is provided based on the operation of the motor at the predetermined threshold value, and to increase the power provided from the alternative power source until the desired motor output is provided.

3. The system of claim 1, wherein the power line is a two-phase power line, and the alternative power source is connected to a third phase of the power line to generate a three-phase power signal.

4. The system of claim 1, wherein the alternative power source includes a battery.

5. The system of claim 4, wherein the alternative power source further includes at least one of a solar panel and a wind turbine.

6. The system of claim 4, wherein the power control system is configured to detect excess power to the motor and to supply a first part of the excess power to the power line, and supply a second part of the excess power to the battery.

7. The system of claim 1, further comprising: a first booster circuit located between the power line and a motor power supply line, the motor power supply line located between the motor and the first booster circuit; and a second booster circuit located between the alternative power source and the motor power supply line.

8. The system of claim 7, wherein the alternative power source includes a battery and at least one of a solar panel and a wind turbine, the second booster is located between the battery and the motor power supply line, and at least one of a solar interface and a wind turbine interface is located between a respective one of the solar panel and the wind turbine and the motor power supply line.

9. An elevator motor power management circuit, comprising:

a motor controller configured to detect a rotation speed of the motor driving an elevator and to detect whether the rotation speed corresponds to a target rotation speed; and
a power controller to detect a power level of a power line connected to a power grid and an alternative power source and to control the alternative power source to output power to the motor in addition to power supplied from the power line upon determining that a power level of the power line is at a predetermined maximum level and the rotation speed of the motor is less than the target rotation speed;
wherein the predetermined maximum level is a maximum power level able to be supplied from the power line.

10. The motor power management circuit of claim 9, wherein the alternative power source includes a battery.

11. The elevator motor power management circuit of claim 10, wherein the alternative power source further includes at least one of a solar panel and a wind turbine.

12. The elevator motor power management circuit of claim 9, wherein the power line is a multi-phase power line and the alternative power source is connected to a phase of the multi-phase power line.

13. A method, comprising:
detecting a rotation speed of a motor configured to drive an elevator;
detecting a power level of a power line supplying power to the motor; and
combining power from an alternative power source with power from the power line to drive the motor upon determining that the power level of the power line is at a predetermined maximum level and a rotation speed of the motor is less than a target rotation speed;
wherein the predetermined maximum level is a maximum power level able to be supplied from the power line.

14. The method of claim 13, further comprising increasing a level of power supplied from the alternative power source until the rotation speed of the motor equals the target rotation speed.

15. The method of claim 13, wherein the alternative power source includes a battery.

16. The method of claim 15, wherein the alternative power source further includes at least one of a solar panel and a wind turbine.

17. The method of claim 15, further comprising: detecting excess power to the motor and supplying a first part of the excess power to the power line and supplying a second part of the excess power to the battery.

* * * * *